United States Patent [19]
Kovalak et al.

[11] Patent Number: 5,526,921
[45] Date of Patent: Jun. 18, 1996

[54] INTERSECTING BI-DIRECTIONAL BUCKETS FOR A BUCKET ELEVATOR SYSTEM

[75] Inventors: Robert J. Kovalak, Homer City; Harold E. Patterson, Indiana; Paul I. Sleppy, Penn Run, all of Pa.

[73] Assignee: FMC Corporation, Chicago, Ill.

[21] Appl. No.: 32,468

[22] Filed: Mar. 16, 1993

Related U.S. Application Data

[63] Continuation of Ser. No. 760,780, Sep. 13, 1991, abandoned.

[51] Int. Cl.⁶ .................................................. B65G 47/40
[52] U.S. Cl. ........................... 198/706; 198/708; 198/712; 198/713
[58] Field of Search ........................... 198/703, 706, 198/708, 712, 713

[56] References Cited

U.S. PATENT DOCUMENTS

| | | | |
|---|---|---|---|
| 604,234 | 5/1898 | Hunt | 198/706 |
| 968,795 | 8/1910 | Peck | 198/708 |
| 2,426,304 | 8/1947 | Hapman | 198/703 |
| 3,044,602 | 7/1962 | Amato | 198/706 |
| 3,055,486 | 9/1962 | Meyer | 198/706 |
| 4,607,745 | 8/1986 | Wiese | 198/706 |
| 4,892,179 | 1/1990 | Lassiter et al. | 198/703 |
| 5,105,933 | 4/1992 | Gough | 198/706 |

FOREIGN PATENT DOCUMENTS 720533  12/1954  United Kingdom ................... 198/708

*Primary Examiner*—Joseph E. Valenza
*Attorney, Agent, or Firm*—Douglas W. Rudy; Michael C. Penn

[57] ABSTRACT

A bucket elevator system capable of being driven bi-directionally. The system having a plurality of pivoted buckets supported between two endless chains. Each bucket having a primary guide boss with an upper surface and a guide surface thereon. Guides arranged to contact the upper surface of the primary guide boll to restrain the pivotal movement of the buckets.

8 Claims, 5 Drawing Sheets

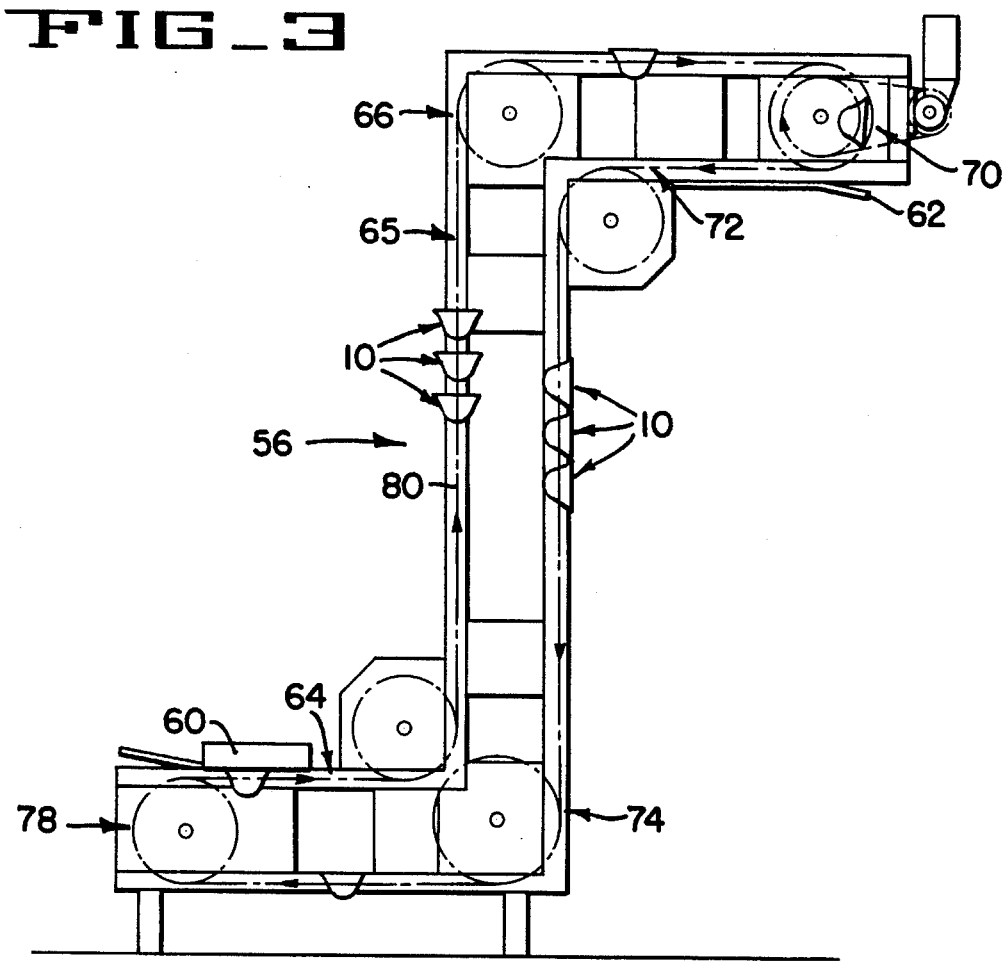
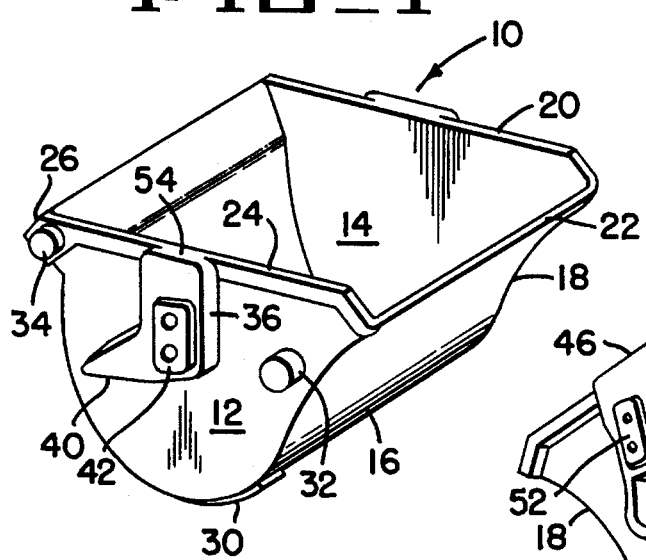
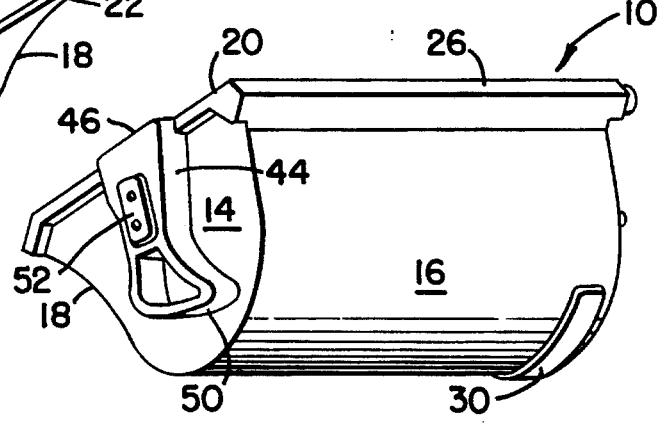

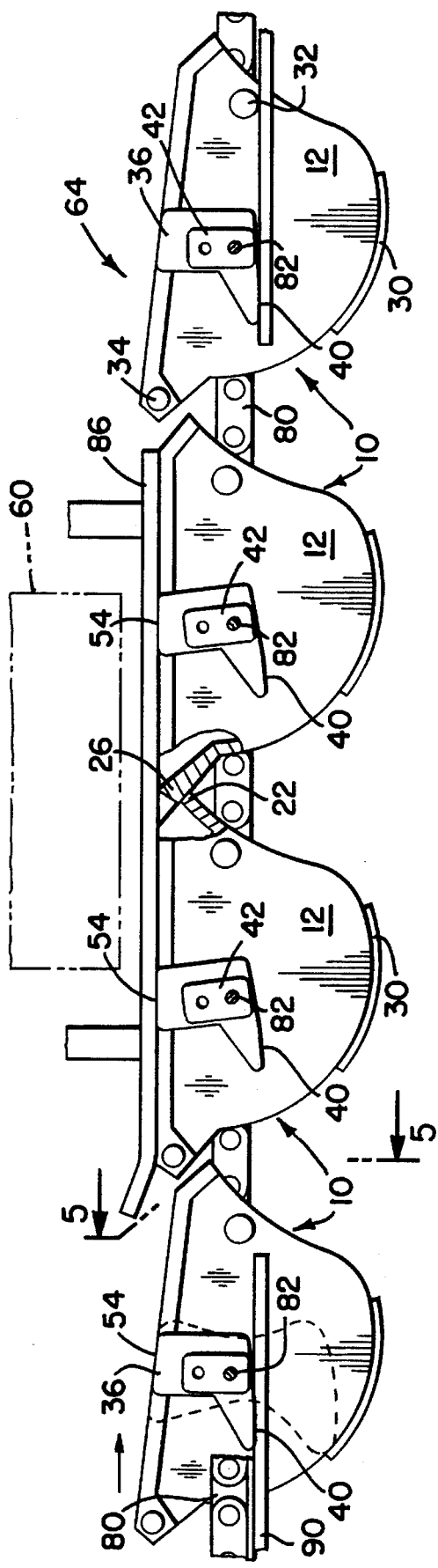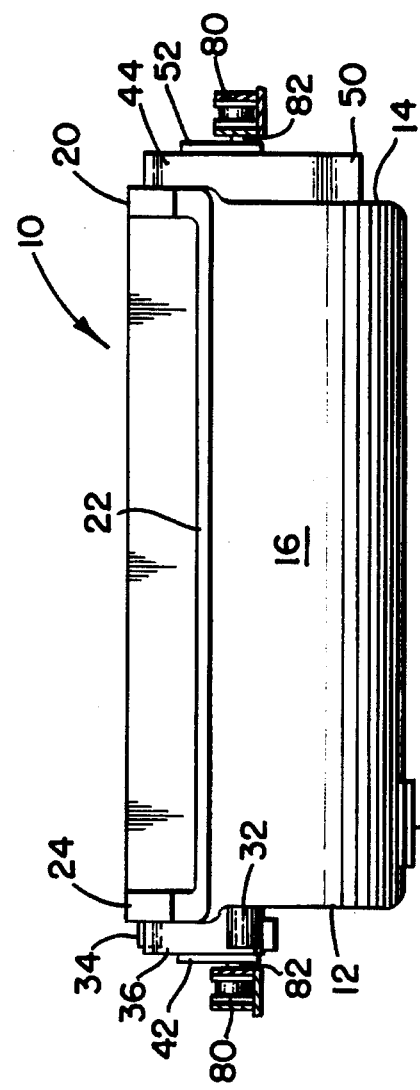

FIG_6
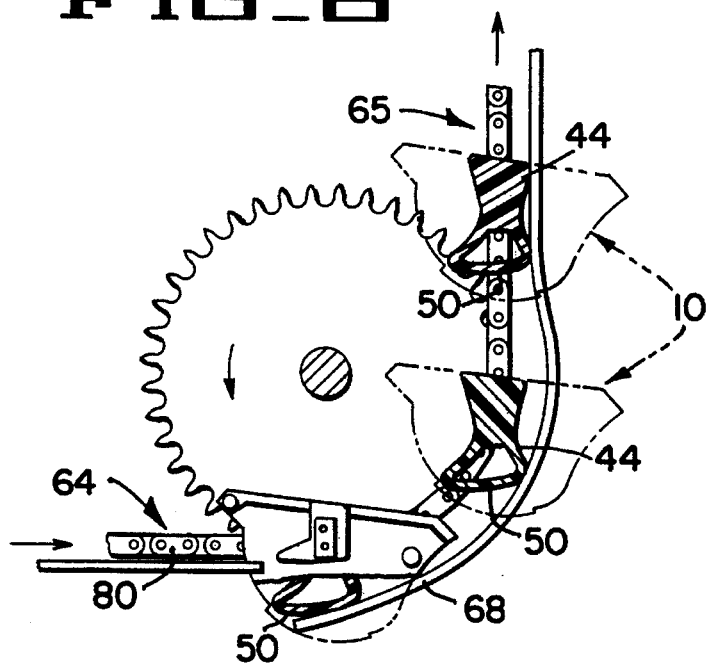
FIG_7
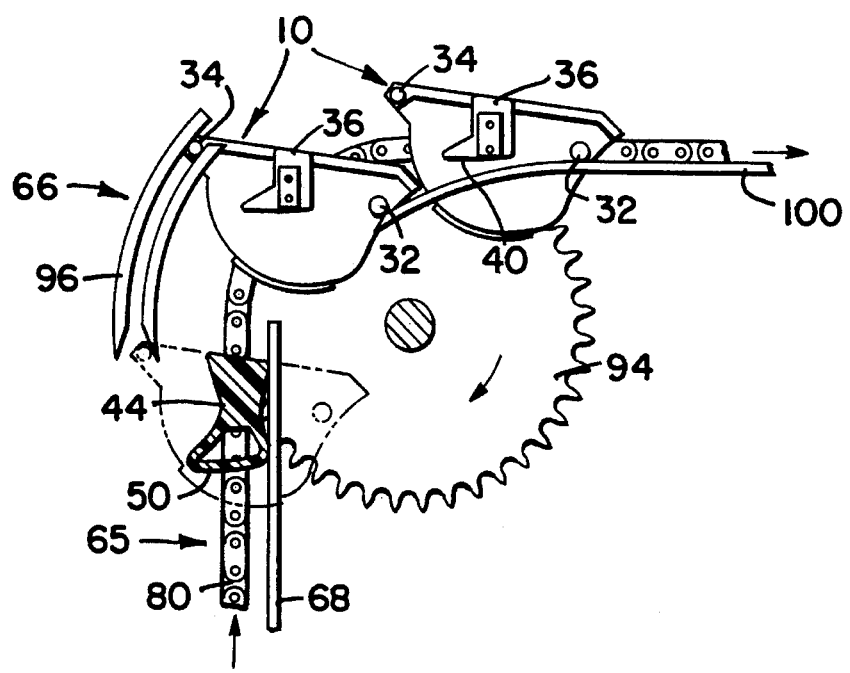

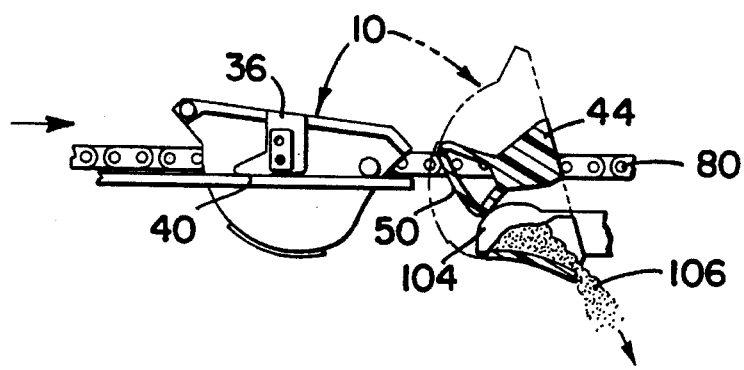
FIG_8
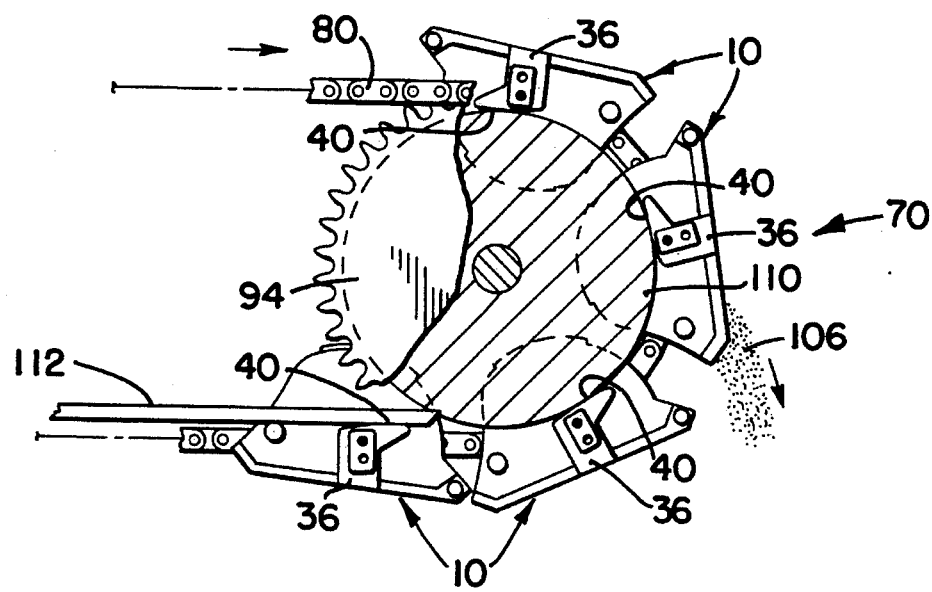
FIG_9
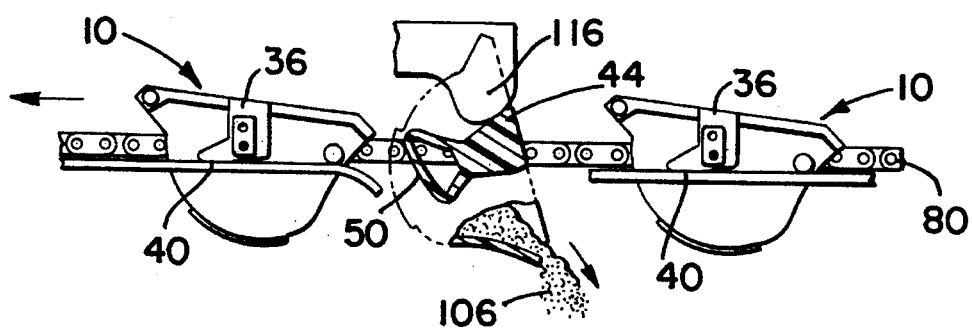
FIG_10

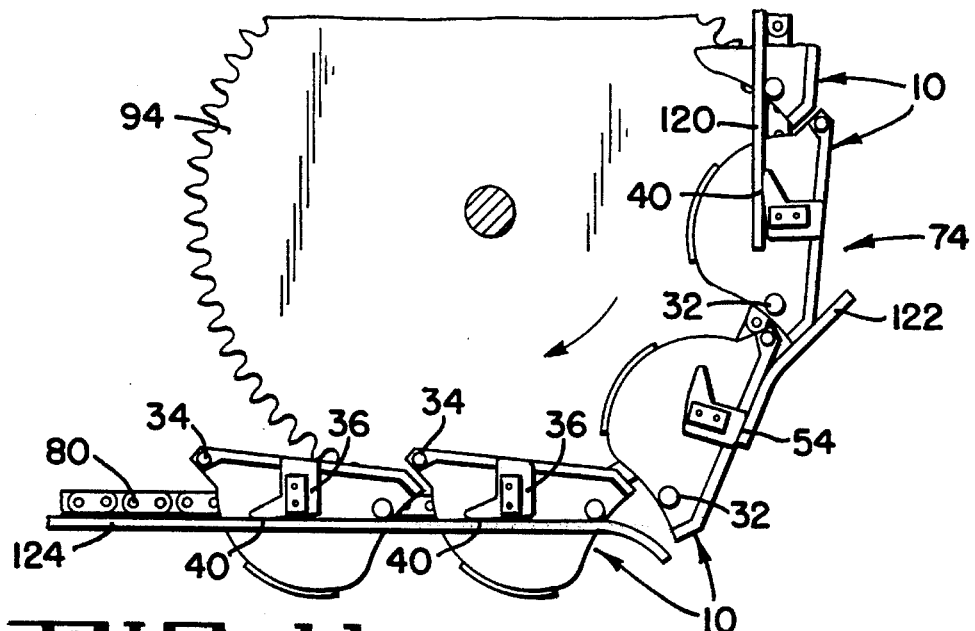
FIG_11
FIG_12
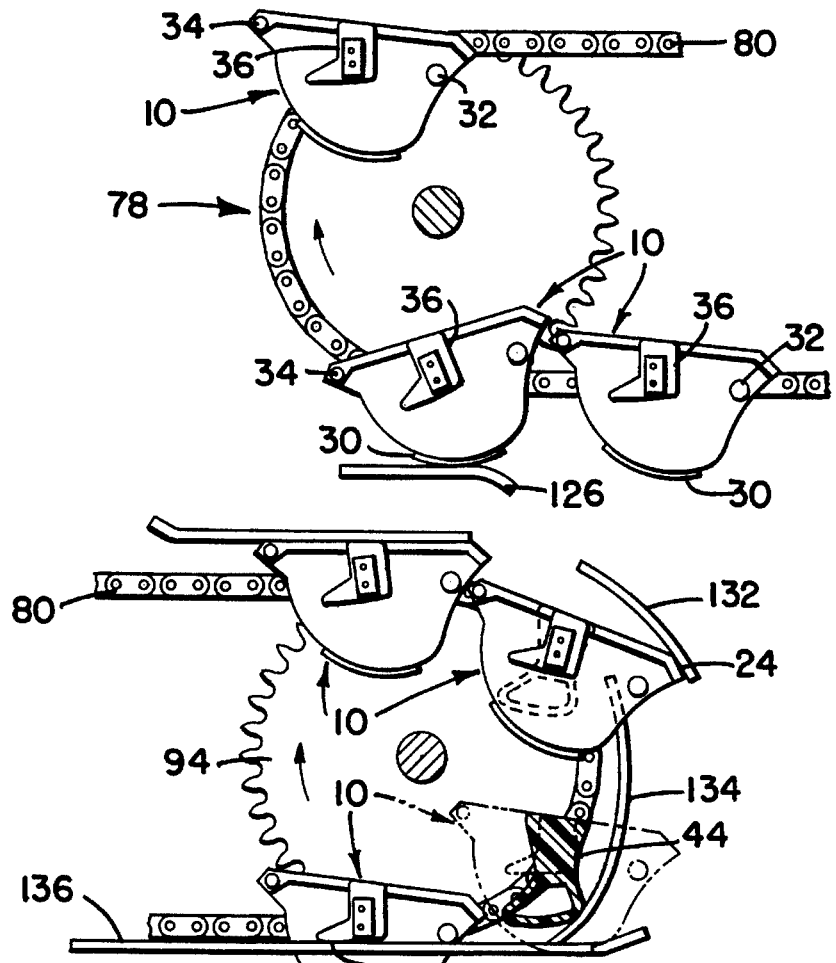
FIG_13

INTERSECTING BI-DIRECTIONAL BUCKETS FOR A BUCKET ELEVATOR SYSTEM

This is a continuation of application Ser. No. 07/760,780, filed on Sep. 13, 1991 abandoned.

This invention has to do with bucket elevators for use in material handling situations. More specifically this invention has to do with an improved bucket design that allows a bucket elevator to be bi-directionally driven so that buckets can be unloaded while the system is traveling "forward" or "backward" while still maintaining a seal between the edges of adjacent buckets during times when a seal is desired.

Prior art buckets for bucket elevators are designed with overlaying flanges to provide a sealed area between buckets however such overlapping flanges prevent the buckets from being "bi-directional". To provide the prior art devices with the desirable reversible function as provided in this invention the overlapping flanges of the prior art devices must be removed (which causes leakage at infeed points) or requires the addition of a separate, driven and syncronized overlapping flange and chain combination in the feed area.

The buckets provided herein do not rely on gravity to swing into positions such as to load or to dump their load but use a number of bosses molded to the bucket to guide and control the attitude of the bucket throughout the bucket's travel around a plurality of turning sprockets and through loading and unloading stations.

The buckets of the instant invention are cast with a reverse curve lip that adds stiffness to the bucket walls. This reverse curve lip does away with the need for a longitudinal rib along the discharge lip and allows heretofore unmoldable bucket lengths to be molded without the need for transverse ribs to stiffen the bucket walls. In the following description many bucket translations are shown. The bucket shape and advantages will be apparent from a reading of the following description of a preferred embodiment and purusal of the drawing figures.

The invention is shown in the figures wherein:

FIG. 1 is a perspective view of a single forward facing bucket;

FIG. 2 is a perspective view of a rearward facing bucket;

FIG. 3 is a schematic elevation view of a typical bucket elevation system of a simple bucket elevator installation;

FIG. 4 is a side elevation view of several buckets in a bucket filling zone with portions of the adjacent buckets broken away to show the interlocking lip structure;

FIG. 5 is a view taken through plane 5—5 of FIG. 4;

FIG. 6 is a depiction of a series of partially sectioned buckets making a stable ninety degree turn from a horizontal to vertical direction;

FIG. 7 is a depiction of a series of partially sectioned buckets making a stable ninety degree turn from a vertical to horizontal direction;

FIG. 8 is a depiction of a partially sectioned bucket performing a forward mechanical dump while traveling horizontally;

FIG. 9 is a depiction of a mechanically assisted dump to full bucket invert while performing a one hundred eighty degree turn;

FIG. 10 is a depiction of a rearward mechanical dump while buckets are traveling horizontally;

FIG. 11 is a depiction of a ninety degree turn from vertical to horizontal with bucket invert;

FIG. 12 depicts a one hundred eighty degree unstabilized turn from horizontal travel to horizontal travel;

FIG. 13 depicts a one hundred eighty degree stabilized turn from horizontal travel to horizontal travel.

The basic invention herein centers around the specific configuration of the buckets of the bucket elevator system. The bucket design allows various rail and guide members to interface with the bucket. The design also allows these buckets to be moved either forward or backward with equal facility and utility. That is to say, the entire system of buckets and drive chain to which the buckets are attached can be driven in either a forward direction or a reverse direction and the filling and unloading can be accomplished as determined by the set up of the bucket transport system.

It is best to describe the buckets shown in FIGS. 1 and 2 before moving into a description of how the buckets can be manipulated in a typical bucket transport system.

The bucket, generally 10, used to transport any type of flowable products such as grains, sand, potato chips, spices, fruit fillings, ore, liquids, powders, sludge, etc., is an open top container having a first end wall 12, a second end wall 14, connected together and separated by a curvalinear container web 16, further housing a reverse curve portion 18, connected to each end wall to form the open top container. The bucket 10 has a significant structural reinforced edge made up of portions 20 along the upper edge of second end wall 14, portion 22 along the upper, normally leading edge of the curvalinear containment web 16, portion 24 along the upper edge of first end wall 12 and portion 26 along the upper, normally trailing edge of the curvalinear containment web 16.

The bucket 10, also has several appendages that are used to guide the bucket as it is being transported through a bucket lift system. These appendages include a contact pad 30 affixed to or integrally formed with the bucket. The contact pad 30, in a preferred embodiment, is proximate the first end wall 12 but inboard thereof on the bottom of the curvalinear containment web 16. Other locations for the contact pad as well as complete elimination of the contact pad are alternative embodiments contemplated by the inventor.

Three appendages are formed on the first end wall 12. These include leading guide boss 32 located on the outside of the first end wall 12 some distance below the structural portion 24 along the upper edge of the first end wall. A second guide boss, a trailing guide boss 34, is attached to an upper area of the first end wall 12 near the zone where the structural portion 26 along the upper normally trailing edge of the curvalinear containment web 16 is located. The third appendage is a primary guide boss 36 integral with or affixed to the first end wall 12. This primary guide boss 36 extends upward to the upper edge of the portion 24 along the upper edge of the first end wall and out from the major planar surface of the first end wall 12.

The primary guide boss 36 includes a guide surface 40 at a relatively lower portion of the primary guide boss 36. A chain attachment plinth 42, provided with at least one aperture in the preferred embodiment shown, is accommodated on the primary guide boss 36.

On the outboard surface of the second end wall 14, as best seen in FIG. 2, is a bucket cam element 44. The bucket cam element 44 is formed integral with the bucket 10 or subsequently affixed to the outboard surface of the second end wall 14. This bucket cam element 44 includes an upper surface 46 which is the same relative height as the upper surface of the portion 20 of the upper edge of the second end wall.

The bucket cam element 44 also includes a primary cam 50 at the relatively lower end of the bucket cam element 44. A chain attachment plinth 52 may also be formed on or affixed to the outboard surface of the bucket cam element between the primary cam 50 and the upper surface 46 of the bucket cam element.

As best seen in FIG. 2 the structural portion 26 along the upper normally trailing edge of the curvalinear containment web is a reinforced edge of significant dimension. This reinforced edge 26 eliminates the need for a stiffening web on the exterior of the curvalinear containment web below the upper normally trailing edge of the curvalinear containment web.

A normal arrangement of buckets is shown in FIG. 4. The buckets are supported between two continous chains such as 80 by means of chain pivot attachment means 82 which interact with the apertures in the primary guide boss 36 and bucket cam element 44. The chain nearest the viewer in FIG. 4 has been removed for clarity. Shown in FIG. 4 is a guide rail 90 along which the guide surface of the primary guide boss 40 rides and keeps the bucket generally 10 somewhat skewed from horizontal. As the bucket travels to the right in FIG. 4 engagement with guide rail 90 will terminate and engagement between surface 54, the upper surface of the primary guide boss, will commence with the rail 86 also known as the guide means. The buckets 10 will be held horizontal under rail 86 as they pass under a feed zone 60.

With the buckets in a horizontal position the leading edge of a trailing bucket will nest with the trailing edge of a preceeding bucket such that, as shown in the broken away section of buckets in the middle of FIG. 4, a seal is made between the buckets as the portion along the upper leading edge of the curvalinear containment web 22 tucks under and against the trailing portion of the leading bucket along the upper normally trailing edge of the curvalinear containment web 26 (FIG. 2).

This nesting or overlap allows the buckets to be filled from the fill spout 60 without material being dropped between the buckets and without the need for a separate blocking plate between buckets.

FIG. 5 simply presents a front elevation of a bucket showing how chains 80 are mounted to the bucket, or vice versa by means of chain pivot attachment means 82.

In FIG. 3 a typical lift system generally 56 is shown somewhat diagramatically. The various zones of concern in this figure include the feed zone 60 discussed above; a horizontal to vertical transition zone 64; a vertical to horizontal transition zone 65; an unioading zone 70, which may include a product deflector 62; a horizontal to vertical transition zone 72, a zone where buckets are transported in a rotated position; a vertical to horizontal transition zone 74; and a change of direction zone 78 just before the feed zone 60. Each of these zones-are shown in FIGS. 4, and 6–13 as well as several alternative bucket manipulation operations.

In FIG. 6 the full buckets are driven from their horizontal travel by means of two sprockets, one for each chain, to a vertical position. A guide rail 68 is in contact with the primary cam 50 and contacts an upper portion of the bucket cam element as well as a lower portion of the bucket cam element to hold the bucket generally horizontal as shown by FIG. 6 as the bucket ascends vertically. Guide rail 68 will be used for the entire vertical run.

FIG. 7 shows a series of buckets 10 in a transition station generally 66. As the buckets approach the station from a vertical run, guided by guide rail 88, which could in some circumstances be the continuation of quadrant 68 in FIG. 6, in contact with the bucket cam element 44, the trailing guide boss 34 will be fed into the guide track 96 which will guide the bucket through the turn from vertical to horizontal. Before boss 34 is disengaged from track 96 boss 32 will become engaged with guide rail 100 to assist in maintaining the bucket 10 in a generally horizontal deployment. Once the bucket 10 has been driven by the sprocket 94, via the chain 80, to the horizontal position, guide rail 100 in cooperation with the guide surface on the primary guide boss 40 will hold the bucket in a nearly horizontal position as shown.

The full buckets will travel to an unloading station generally 70 shown by FIG. 9. In this zone the loaded buckets will encounter a modified sprocket drive 94. The modification being that each of the sprockets have a disc 110 mounted on the face of the sprocket that provides a surface in contact with the guide surface 40. Obviously, as the buckets are rotated such that their normal position is no longer horizontal the bucket load 106 will spill out of the bucket. As the buckets head away from the unloading and turning zone they could be maintained relatively upside down by contact of the guide surface 40 with guide rail 112.

FIG. 8 presents an alternative unloading scheme. In this figure the buckets 10 are unloaded while traveling in a horizontal path by means of a cam 104 which is placed to interact with the primary cam 50 of the bucket 10. The cams will interact such that the bucket is tilted out of horizontal to near vertical and the load 106 will be spilled out of the bucket.

FIG. 10 is another unloading scheme. This time the buckets are traveling in the direction opposite the direction shown in FIGS. 8 and 9. One advantage of this invention is that the buckets can go either forward or backward with equal facility.

In FIG. 10 a cam 116 interacts with a portion of the primary cam 50 to cause the bucket to tip away from the normal direction of travel and thus empty the load from the bucket 10.

FIG. 11 shows the transition zone generally 74 where the buckets are translated from moving vertically downward in a rotated position to a horizontal position where the buckets are horizontal. Guide rail 120 interacting with the guide surface 40 keeps the buckets rotated ninety degrees from horizontal. As the chain and buckets are driven by the sprocket 94 around the "corner", guide rail 122 holds the bucket in a preferred position. The leading guide boss 32 contacts guide rail 124 and flips the bucket to a horizontal position and through contact with the guide surface 40 the guide rail 124 holds the bucket in a horizontal position as shown in FIG. 11.

In FIG. 12 the buckets 10 are moving from one horizontal direction to the opposite horizontal direction. Contact pad 30 contacts guide member 126 which causes the bucket to tip slightly out of horizontal.

In FIG. 13 the buckets are shown going from one horizontal direction to the opposite horizontal direction while the bucket is maintained in a near horizontal position. Guide rail 132 contacts surface 24 to keep the bucket from oscillating while guide rail 134 in contact with the bucket cam element 44 keeps the bucket horizontal as it goes through the curve defined by the sprocket 94. Once the bucket is traveling horizontally the guide rail 136, in contact with the guide surface 40, will keep the bucket generally horizontal.

It can be seen by the foregoing description and attendent figures that the buckets of this invention can be easily driven and controlled through numerous translations. The following claims attempt to preserve for the inventors hereof their rights in the discovery disclosed herein. Nuances of design that are not shown in the figures are contemplated by the inventors as being within the scope of these claims, wherein:

What is claimed is:

1. A bucket elevator system capable of being driven bi-directionally, said system having a plurality of buckets which are supported between two continuous chains, each bucket having a primary guide boss with an upper surface thereon and guide surface thereon, the improvement comprising:

means to drive said system such that said buckets may be moved in a forward and in a subsequent backward direction;

guide means associated with said system and arranged to contact said upper surface of said primary guide boss of said buckets;

said buckets having interacting leading and trailing edges that will co-act with adjacent buckets to form a seal between said adjacent buckets when said buckets are maintained in a restrained position by said guide means contacting said upper surface of said primary guide boss of said buckets whereby adjacent buckets are in contact and said buckets are not in contact when said buckets are not maintained in a restrained position when said guide means is not in contact with said upper surface of said primary guide boss of said buckets.

2. The invention in accordance with claim 1 wherein said primary guide boss is affixed to a first end wall of said bucket and extends upwardly to the upper edge of said first end wall.

3. The invention in accordance with claim 2 wherein said first end wall further includes a leading guide boss and a trailing guide boss affixed thereto.

4. The invention in accordance with claim 3 wherein said buckets include a reinforcing edge and an upper leading edge, a first of said buckets having its reinforcing edge contacting said upper leading edge of an adjacent bucket.

5. A bucket for use in a bucket conveyor system which includes a horizontal guide means, said bucket comprising:

a first end wall having an upper edge;

a second end wall;

a curvilinear containment web connecting said first end wall with said second end wall;

a primary guide boss having an upper surface, said primary guide boss affixed to said first end wall, said primary guide boss extending to the upper edge of the first end wall and said primary guide boss including a primary guide boss guide surface at a relatively lower portion of said primary guide boss, whereby said upper surface of said primary guide boss is provided to maintain said bucket in a horizontal position when said primary guide boss upper surface is in contact with said guide means.

6. The invention in accordance with claim 5 wherein said second end wall includes a bucket cam element affixed to the outboard surface of the second end wall, said bucket cam element including an upper surface and a primary cam at a relatively lower end of said bucket cam element.

7. The invention in accordance with claim 6 wherein a leading guide boss and a trailing guide boss are attached to said first end wall.

8. A bucket for use in a bucket conveyor system which includes first and second guide means, said bucket comprising:

a first end wall having an upper edge;

a second end wall;

a curvilinear containment web connecting said first end wall with said second end wall;

a primary guide boss having an upper surface and a lower guide surface which is inclined downwardly and rearwardly toward the rear portion of said bucket, said primary guide boss affixed to said first end wall, said primary guide boss extending to the upper edge of the first end wall whereby said upper surface of said primary guide boss is provided to maintain said bucket in a horizontal position when said primary guide boss upper surface is in contact with said first guide means and said lower guide surface of said primary guide boss is provided to maintain said bucket in a non-horizontal position when said primary guide boss lower guide surface is in contact with said second guide means.

\* \* \* \* \*